(12) United States Patent
Watanabe et al.

(10) Patent No.: US 9,036,935 B2
(45) Date of Patent: May 19, 2015

(54) IMAGE CODING APPARATUS AND IMAGE CODING METHOD

(71) Applicant: KABUSHIKI KAISHA TOSHIBA, Tokyo (JP)

(72) Inventors: Takashi Watanabe, Kanagawa-ken (JP); Atsushi Matsumura, Kanagawa-ken (JP); Tomoya Kodama, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/193,465

(22) Filed: Feb. 28, 2014

(65) Prior Publication Data
US 2014/0270558 A1    Sep. 18, 2014

(30) Foreign Application Priority Data

Mar. 13, 2013    (JP) .................................. 2013-051064

(51) Int. Cl.
| | |
|---|---|
| *G06K 9/62* | (2006.01) |
| *H04N 19/146* | (2014.01) |
| *H04N 19/70* | (2014.01) |
| *H04N 19/15* | (2014.01) |
| *H04N 19/107* | (2014.01) |
| *H04N 19/124* | (2014.01) |
| *H04N 19/174* | (2014.01) |
| *H04N 19/436* | (2014.01) |
| *H04N 19/463* | (2014.01) |

(52) U.S. Cl.
CPC ......... *H04N 19/00169* (2013.01); *H04N 19/70* (2013.01); *H04N 19/15* (2013.01); *H04N 19/107* (2013.01); *H04N 19/124* (2013.01); *H04N 19/174* (2013.01); *H04N 19/436* (2013.01); *H04N 19/463* (2013.01)

(58) Field of Classification Search
USPC .......................................... 382/232, 233, 239
See application file for complete search history.

(56) References Cited

U.S. PATENT DOCUMENTS

2004/0213346 A1    10/2004    Matsumura et al.
2008/0075164 A1    3/2008    Matsumura

FOREIGN PATENT DOCUMENTS

JP    2008-271213    11/2008

OTHER PUBLICATIONS

Test Model Editing Committee, "Test Model 5", Document AVC-491b, Version 2, Telecommunication Standardization Sector, Study Group 15, (Apr. 1993), 5 pages.
Matsumura, U.S. Appl. No. 11/832,396, filed Aug. 1, 2007.
Matsumura, et al., U.S. Appl. No. 10/821,864, filed Dec. 4, 2004.

*Primary Examiner* — Duy M Dang
(74) *Attorney, Agent, or Firm* — Nixon & Vanderhye, P.C.

(57) ABSTRACT

First coded data are generated from a target block by a first coding mode. Second coded data having predetermined amount are generated from the target block by a second coding mode. Whether to encode by the first coding mode or the second coding mode is decided. Based on the decision result, any of the first coded data and the second coded data is selected. If a total amount of coded data of a segment is over a target amount, encoding by the second coding mode is decided. The segment comprises blocks including the target block. The total amount is sum of an amount of coded data generated from blocks prior to the target block in the segment, an amount of the first coded data, an amount of coded data to be generated from remained blocks in the segment by the second coding mode.

8 Claims, 18 Drawing Sheets

```
encoded_unit_data( ) {
  codec_mode
  if(codec_mode == MODE_1) {
    delta_qp
    pred_mode
    for(i=0; i<NUM_COEFF; i++)
      coeff[i]
    }
  }
  else if(codec_mode == MODE_2) {
    pred_mode
  }
}
```

FIG.7

```
encoded_unit_data( ) {
  codec_mode
  if(codec_mode == MODE_1) {
     delta_qp
     pred_mode
     for(i=0; i<NUM_COEFF; i++)
        coeff[i]
     }
  }
  else if(codec_mode == MODE_2) {
     pred_mode
     for(i=0; i<NUM_PCM_PIXEL; i++) {
        pixel_value[i]
     }
  }
}
```

FIG.12

```
encoded_unit_data( ) {
    codec_mode
    if(codec_mode == MODE_1) {
        delta_qp
        pred_mode
        for(i=0; i<NUM_COEFF; i++)
            coeff[i]
    }
    }
    else if(codec_mode == MODE_2) {
    }
}
```

FIG.13

```
encoded_unit_data( ) {
    codec_mode
    if(codec_mode == MODE_1) {
        delta_qp
        pred_mode
        for(i=0; i<NUM_COEFF; i++)
            coeff[i]
        }
    }
    else if(codec_mode == MODE_2) {
    }
    else if(codec_mode == MODE_3) {
        for(i=0; i<NUM_PIXEL_UNIT; i++) {
            input_pixel_value[i]
        }
    }
}
```

FIG.15

```
encoded_unit_data( ) {
  codec_mode
  if(codec_mode == MODE_1) {
    delta_qp
    pred_mode
    for(i=0; i<NUM_COEFF; i++) {
      coeff[i]
    }
  }
  else if(codec_mode == MODE_2) {
  }
  else if(codec_mode == MODE_3) {
    for(i=0; i<NUM_PIXEL_UNIT; i++) {
      input_pixel_value[i]
    }
    for(i=0; i<NUM_REF_PIXEL; i++) {
      diff_pixel_value[i]
    }
  }
}
```

FIG.16

IMAGE CODING APPARATUS AND IMAGE CODING METHOD

CROSS-REFERENCE TO RELATED APPLICATION

This application is based upon and claims the benefit of priority from Japanese Patent Application No. 2013-051064, filed on Mar. 13, 2013; the entire contents of which are incorporated herein by reference.

FIELD

Embodiments described herein relate generally to an image coding apparatus and an image coding method.

BACKGROUND

As to the image coding process using transform/quantization, in order to encode so as to generate a target amount of coded data, a rate control method for adaptively switch a quantization scale based on the amount of coded data generated in the past is used. The rate control method of conventional technique intends for the amount of coded data to converge at a desired amount of coded data. Accordingly, it is not always guaranteed that the accumulated amount of coded data is converged within a target amount of coded data.

In one-pass coding, as a result of the coding process, the accumulated amount of coded data may be over the target amount of coded data. If an encoder is composed with hardware and if a size of a bit stream is previously defined, when the accumulated amount of coded data is over the target amount of coded data, it is a problem that the bit stream is failed.

A coding method for avoiding the failure of the stream buffer is disclosed. In this method, a minimum amount of coded data and a maximum amount of coded data are determined for one macro block. At a macro block, if the maximum amount of coded data is generated and if the stream buffer is failed, this macro block is encoded so as to generate the minimum amount of coded data.

In above-mentioned method, even if the maximum amount of coded data is generated from this block, the coding condition is switched by whether the stream buffer is failed or not. In general, the image quality is largely degraded by encoding so as to generate the minimum amount of coded data. Accordingly, the coding process by the minimum amount of coded data had better not be selected. On the other hand, in above-mentioned method, a margin of the maximum amount of coded data is equivalently reserved. As a result, it is a problem that the coding process by the minimum amount of coded data is apt to be selected.

BRIEF DESCRIPTION OF THE DRAWINGS

FIG. 7 is one example of syntax of coded data of a unit according to the first embodiment.
FIG. 12 is one example of syntax of coded data of a unit according to the second embodiment.
FIG. 13 is another example of syntax of coded data of a unit according to the second embodiment.
FIG. 15 is one example of syntax of coded data of a unit according to the third embodiment.
FIG. 16 is another example of syntax of coded data of a unit according to the third embodiment.

DETAILED DESCRIPTION

According to one embodiment, an image coding apparatus includes a first coding section, a second coding section, a decision section, and a selection section. The first coding section is configured to generate first coded data from a target block in an input image by a first coding mode. The second coding section is configured to generate second coded data of which amount is predetermined from the target block by a second coding mode. The decision section is configured to decide whether to encode by the first coding mode or the second coding mode. The selection section is configured to select one of the first coded data and the second coded data, based on a decision result of the decision section. The decision section decides to encode by the second coding mode if a total amount of coded data of a segment in the input image is over a target amount of coded data. The segment comprises a plurality of blocks including the target block. The total amount of coded data is a sum of an accumulated amount of coded data generated from blocks prior to the target block in the segment, an amount of the first coded data, and an amount of coded data to be generated from remained blocks in the segment by the second coding mode.

Various embodiments will be described hereinafter with reference to the accompanying drawings.

The First Embodiment

Figure 1:
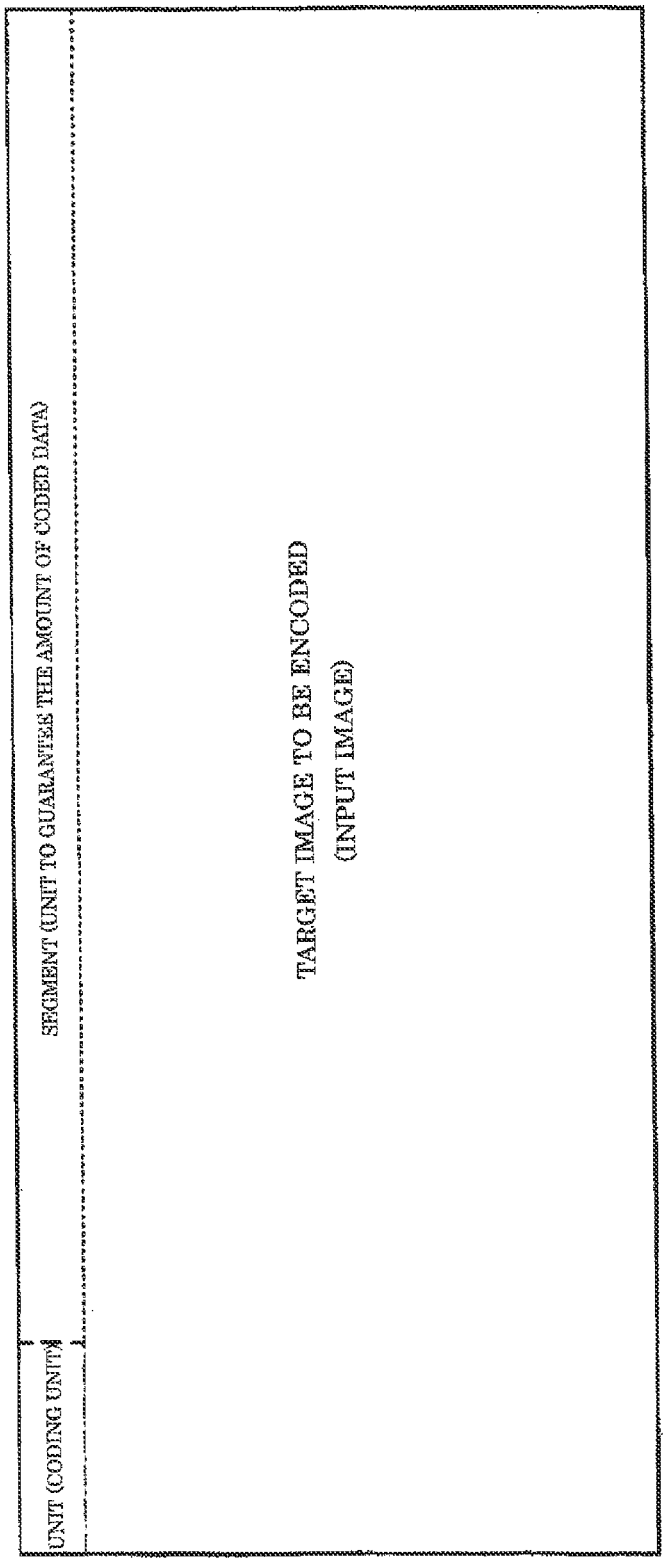
FIG. 1 is one example of a unit to be encoded and decoded.

In following embodiments, as shown in a processing target image (input image) of FIG. 1, a unit to be encoded is called "unit", and a unit to guarantee the amount of coded data is called "segment". In an example of FIG. 1, the unit is a block of pixels, and the segment is one unit line on the image. In an image coding apparatus of the first embodiment, an amount of coded data generated in each unit is not limited. However, the input image is encoded so that a total amount of coded data generated in one segment is smaller than (or equal to) the (predetermined) desired amount of coded data.

Figure 2:
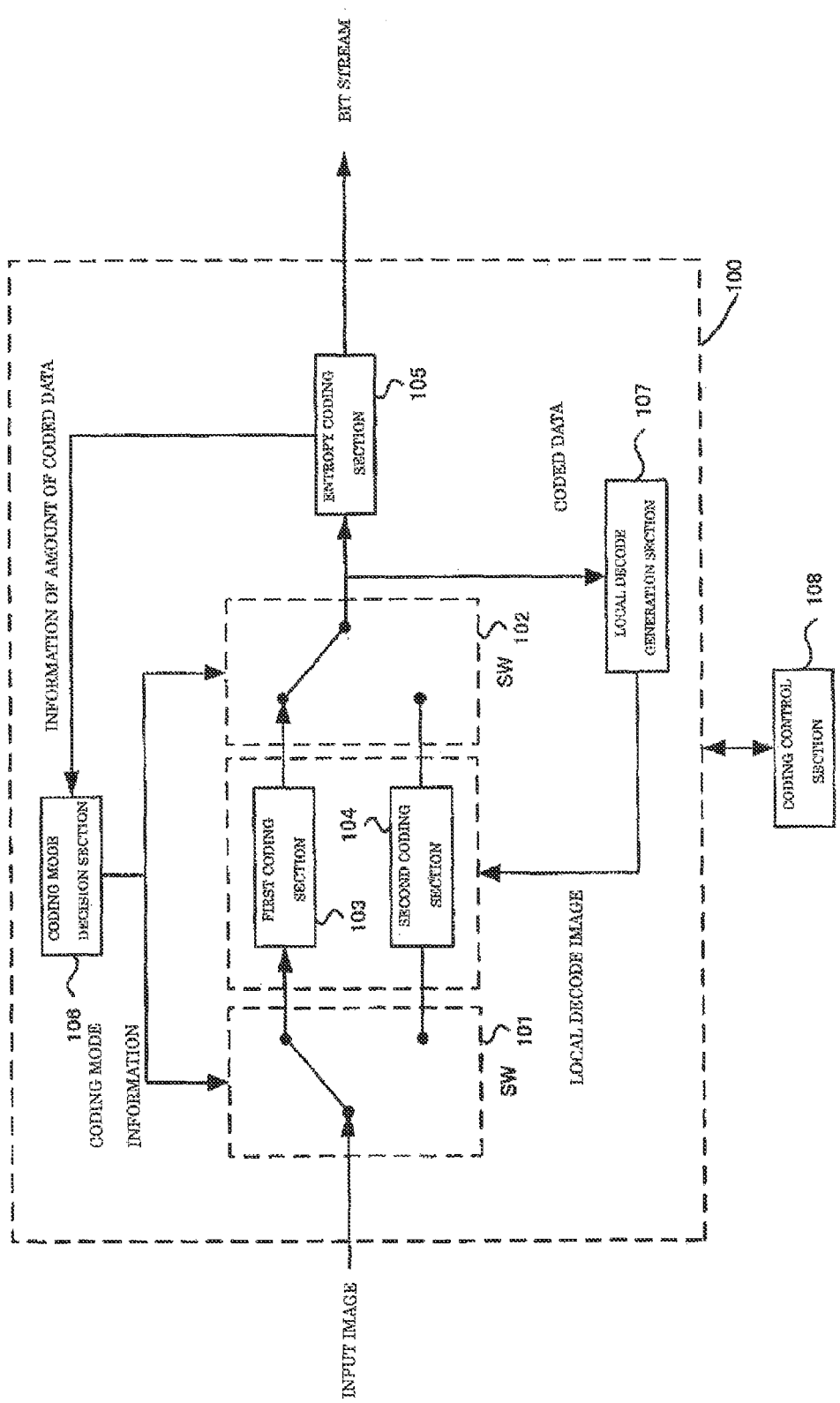
FIG. 2 is a block diagram of an image coding apparatus 100 according to the first embodiment.

FIG. 2 is a block diagram of the image coding apparatus 100 according to the first embodiment. The image coding apparatus 100 includes two switches 101 and 102, a first coding section 103, a second coding section 104, an entropy coding section 105, a coding mode decision section 106, a local decode generation section 107, and a coding control section 108.

The switch 101 receives input image data of a coding target unit, and receives coding mode information from the coding mode decision section 106. If the coding mode information is the first coding mode, the switch 101 sends the input image to the first coding section 103. If the coding mode information is the second coding mode, the switch 101 sends the input image to the second coding section 104.

The first coding section 103 encodes the coding target unit by transform/quantization, and generates the first coded data. Detail of coding process will be explained afterwards.

The second coding section 104 encodes the coding target unit so as to generate a predetermined amount of coded data, and generates the second coded data.

The switch 102 receives coding mode information from the coding mode decision section 106. If the coding mode information is the first coding mode, the switch 102 receives the first coded data from the first coding section 103. If the coding mode information is the second coding mode, the switch 102 receives the second coded data from the second coding section 104. After that, the switch 102 sends these coded data to the entropy coding section 105 and the local decode generation section 107.

The entropy coding section 105 performs entropy coding to the coded data received, and generates a bit stream. Here, the entropy coding section 105 sends information of amount of coded data to the coding mode decision section 106.

The coding mode decision section 106 receives the information of amount of coded data from the entropy coding section 105. Based on this information, the coding mode decision section 106 sets coding mode information of subsequent units, and sends the coding mode information to the switches 101 and 102.

The local decode generation section 107 receives the coded data from the switch 102, and generates a local decode image by decoding the coded data. If the first coded data is received, the local decode generation section 107 performs decoding corresponding to the encoding process performed by the first coding section 103. If the second coded data is received, the local decode generation section 107 performs decoding process corresponding to the encoding process performed by the second coding section 104. The local decode image is sent to the first coding section 103 and the second coding section 104. This local decode image is used for generating a prediction image when a subsequent unit is encoded.

The coding control section 108 performs feedback control of the generated amount of coded data and quantization control, and control of the prediction direction. Namely, the coding control section 108 controls the first coding section 103 and the second coding section 104.

Figure 3:
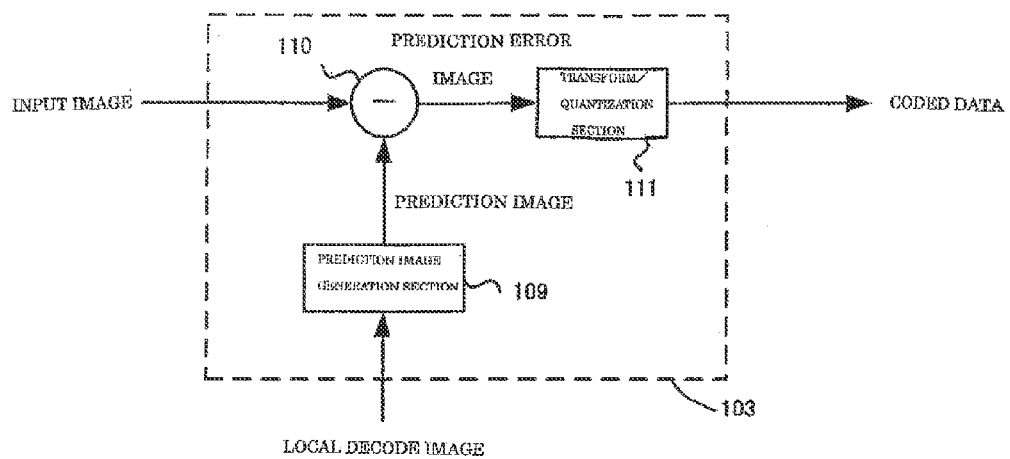
FIG. 3 is a block diagram of a first coding section 103 in FIG. 2.

Next, the first coding section 103 will be explained in detail by referring to FIG. 3. FIG. 3 is a block diagram of the first coding section 103. The first coding section 103 includes a prediction image generation section 109, a subtractor 110, and a transform/quantization section 111.

The prediction image generation section 109 receives the local decode image from the local decode generation section 107, and generates a prediction image corresponding to the processing target unit by predetermined prediction process. The prediction image generation section 109 sends the prediction image to the subtractor 110. As the prediction process, any method may be used. In the first embodiment, one example that a spatial prediction from another unit adjacent to the processing target unit is used. For example, in the same way as the existing codec such as H.264/AVC, the spatial prediction is performed using pixels of another unit adjacent to the processing target unit. Here, a prediction direction for the spatial prediction is set by the coding control section 108.

The subtractor 110 receives the processing target unit of the input image from the switch 101, and receives the prediction image corresponding thereto from the prediction image generation section 109. The subtractor 110 generates a prediction error image by subtracting pixel values of the prediction image from pixel values of the input image. This prediction error image is sent to the transform/quantization section 111.

The transform/quantization section 111 performs transform process to the prediction error image received from the subtractor 110. As the transform processing, for example, transform coefficients are generated by orthogonal transform using DCT (Discrete Cosine Transform). Here, the transform coefficients may be generated using wavelet transform or independent component analysis. Next, based on a quantization parameter set by the coding control section 108, the transform/quantization section 111 performs quantization process to the transform coefficients, and generates coded data. As mentioned-above, the first coding section 103 performs transform/quantization to the prediction error image, i.e., encodes by general coding method.

Figure 4:
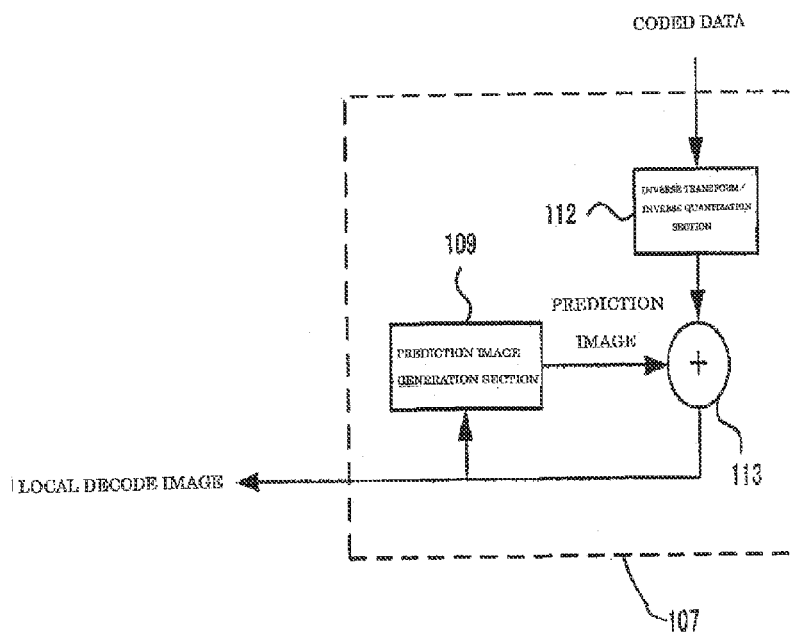
FIG. 4 is a block diagram of a local decode generation section 107 in FIG. 2.

Next, the local decode generation section 107 will be explained in detail by referring to FIG. 4. FIG. 4 is a block diagram of the local decode generation section 107. The local decode generation section 107 includes a prediction image generation section 109, an inverse transform/inverse quantization section 112, and an adder 113.

The inverse transform/inverse quantization section 112 receives the coded data from the switch 102. The inverse transform/inverse quantization section 112 performs inverse quantization to quantized transform coefficients (included in the coded data), based on the quantization parameter set by the coding control section 108. Furthermore, the inverse transform/inverse quantization section 112 performs inverse transform (corresponding to the orthogonal transform performed by the transform/quantization section 111) to the transform coefficients (obtained by inverse quantization), and generates a prediction error image. The prediction error image is sent to the adder 113.

The adder 113 receives the prediction image from the prediction image generation section 109, adds the prediction image to the prediction error image received from the inverse transform/inverse quantization section 112, and generates a local decode image. The local decode image is sent to the first coding section 103, the second coding section 104, and the prediction image generation section 109 (included in the local decode generation section 107) in order to be used for prediction processing at subsequent unit.

The prediction image generation section 109 performs the same processing as the prediction image generation section 109 included in the first coding section 103 in FIG. 3. As a result, the first coding section 103 and the local decode section 107 can use the same prediction image. Moreover, the local decode generation section 107 may not include the prediction image generation section 109, and receives the prediction image generated by the first coding section 103 or the second coding section 104.

Figure 5:
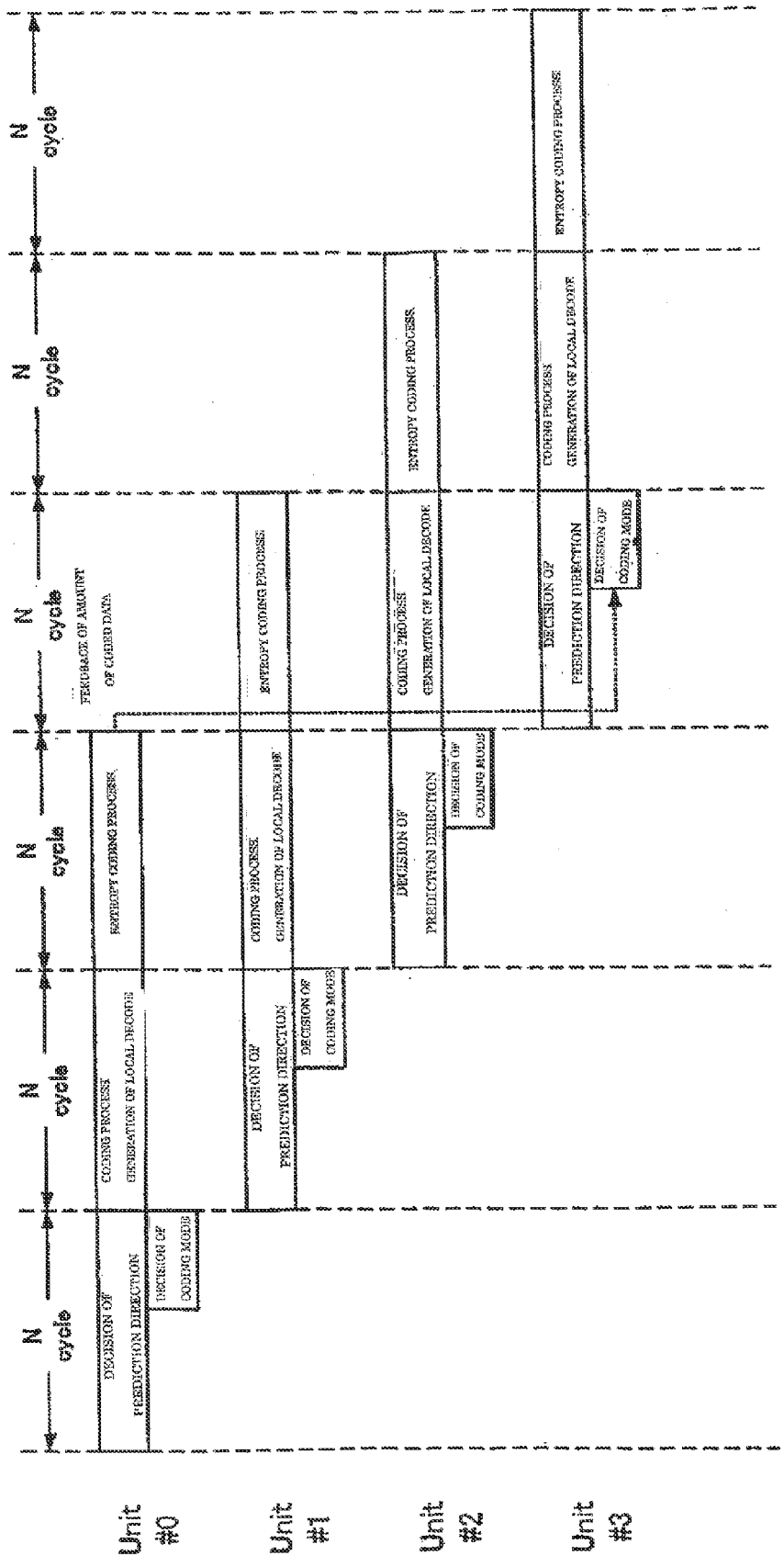
FIG. 5 is a timing chart of operation example of the image coding apparatus 100.

Next, operation of the image coding apparatus 100 will be explained by referring to FIGS. 5 and 6. FIG. 5 is an operation timing chart of the image coding apparatus 100. The image coding apparatus 100 of the first embodiment receives the input image, and encodes each unit in pipeline according to the timing chart in FIG. 5. In FIG. 5, the horizontal axis represents time, and coding process is executed in order of unit #0~#3 indicated on the vertical axis. In the image coding apparatus 100, three operations (decision of prediction direction and coding mode, coding process and generation of local decode, entropy coding) are respectively executed for each unit in N cycles. Detail of each process will be explained by referring to a flow chart of FIG. 6.

Figure 6:
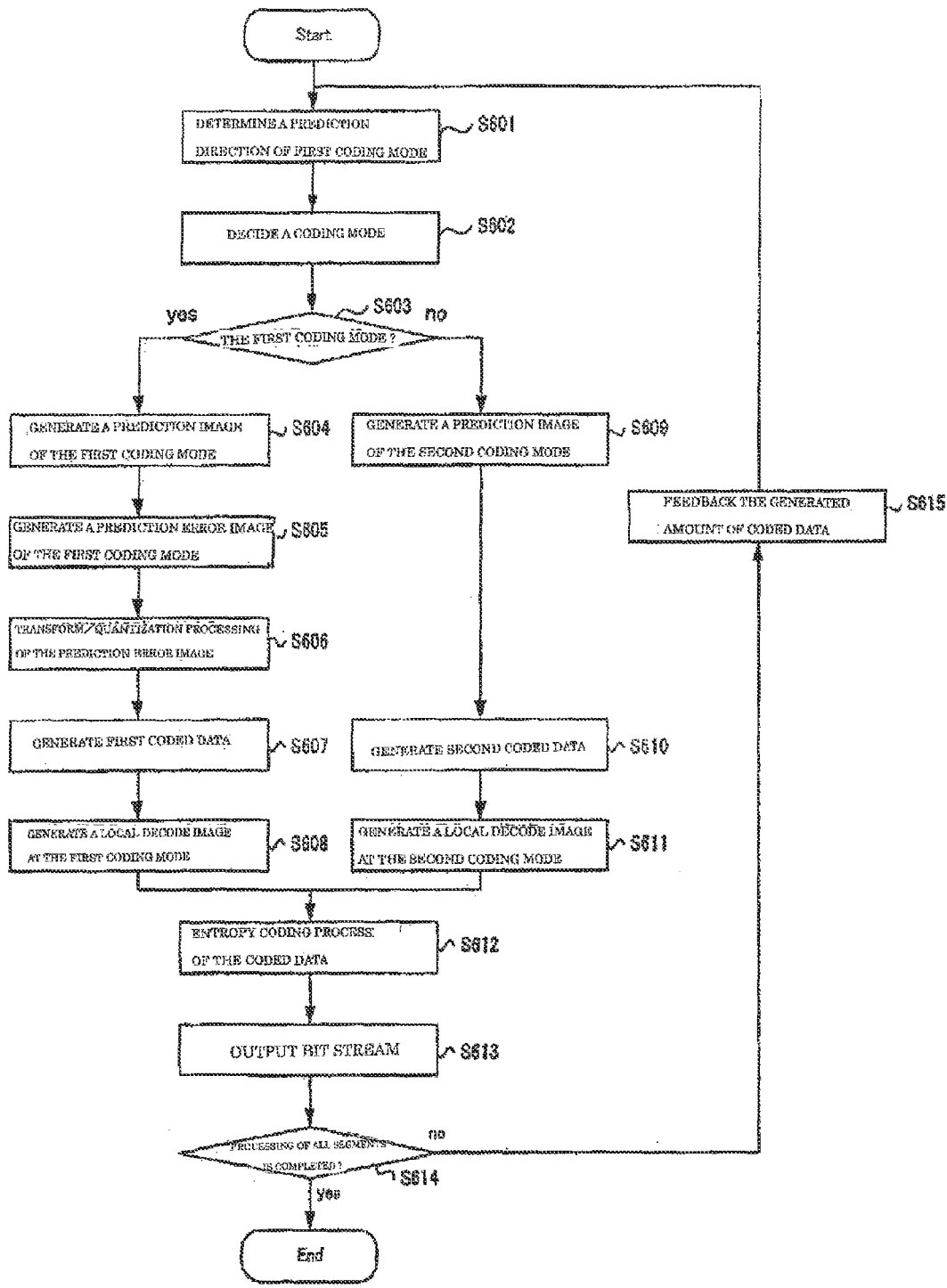
FIG. 6 is a flow chart of processing of the image coding apparatus 100.

FIG. 6 is one example of the flow chart of the image coding apparatus 100. First, when the image coding apparatus 100 receives pixel data included in a processing target unit in the input image, the coding control section 108 determines a prediction direction of the first coding mode (S601). As mentioned-above, the first coding section 103 generally encodes by spatial prediction and transform/quantization process. The prediction direction of spatial prediction may be determined by arbitrary method. In the first embodiment, an example that a prediction direction by which an error between the prediction image and the input image is the smallest is selected from all prediction directions will be explained.

Next, the coding mode decision section 106 decides which coding mode (the first coding mode or the second coding mode) is used (S602). Coding mode information representing one of the first coding mode and the second coding mode used for the coding process is sent to the switch 101. Here, process of the coding mode decision section 106 will be explained afterwards. Processing of S601 and S602 is executed at first N cycles of each unit.

If the coding mode information represents the first coding mode (Yes at S603), the switch 101 sends the input image to the first coding section 103. The prediction image generation section 109 (included in the first coding section 103) generates a prediction image from pixel values of adjacent units included in the local decode image, according to the prediction direction determined by the coding control section 108 (S604). The subtractor 110 generates a prediction error image by subtracting the prediction image from the input image (S605). The transform/quantization section 111 generates quantized transform coefficients by performing transform/quantization to the prediction error image (S606). The transform/quantization section 111 generates the first coded data (S607). The first coded data includes the quantized transform coefficients, the coding mode information representing the first coding mode used for coding process, the prediction direction, and the quantization parameter. The first coded data is sent to the local decode generation section 107.

The local decode generation section 107 performs decoding process corresponding to the encoding process (performed by the first coding section 103) to the first coded data, and generates a local decode image (S608). The local decode image is sent to the first coding section 103 and the second coding section 104.

On the other hand, if the coding mode information is the second coding mode (No at S603), the second coding section 104 generates a prediction image of the second coding mode (S609). Operation of the second coding section 104 will be explained in detail. The second coding section 104 encodes so as to generate a predetermined amount of coded data. If the amount of coded data generated by the first coding section 103 may be over the target amount of coded data, coding by the first coding section 103 is switched to coding by the second coding section 104. As the coding method by the second coding section 104, arbitrary method may be used. However, as mentioned-above, coding process to generate the predetermined amount of coded data is required. Furthermore, in comparison with the amount of coded data generated by the first coding section 103, coding process able to sufficiently generate a smaller amount of coded data is desired. In the first embodiment, for example, by not encoding quantized transform coefficients and by regarding the prediction image as the local decode image, fixed-length coding is realized.

The second coding section 104 generates the second coded data (S610). The second coded data includes coding mode information representing the second coding mode used for coding process. Processing of the second coding section 104 and detail of the second coded data will be explained afterwards. The local decode generation section 107 performs decoding process corresponding to the encoding process (performed by the second coding section 104) to the second coded data, and generates a local decode image (S611). The local decode image is sent to the first coding section 103 and the second coding section 104. Here, the local decode image generated at S608 and S611 is used for prediction process of a subsequent unit, as a reference image.

Processing of S604~S608 and S609~S611 are executed at the second N cycles of each unit.

The coded data is sent to the entropy coding section 105. The entropy coding section 105 performs entropy coding to the first coded data or the second coded data, and generates a bit stream (S612). The bit stream is outputted (S613). If coding process of all units included in the processing target segment is not completed (No at S614), the entropy coding section 105 generates information of amount of coded data, and outputs the information to the coding mode decision section 106 (S615). Here, based on the information of amount of coded data and the target amount of coded data (set to entire segment), the coding mode decision section 106 decides the coding mode of next unit. Detail processing thereof will be explained afterwards. Furthermore, the information of amount of coded data is feedbacked to the coding control section 108 in order to be used for setting the quantization parameter.

If coding process of all units included in the processing target segment is completed (Yes at S614), coding process of the segment is completed.

Processing of S612~S615 is executed at last N cycles of each unit. In the first embodiment, coding process of each unit comprises above-mentioned three stages. As shown in FIG. 5, while a plurality of units (#0~#3) is processed in pipeline, processing timing thereof is shifted as one stage (N cycles) between two adjacent units in processing order. Processing included in each cycle may be processing except for above-mentioned example. Furthermore, the number of stages may be number except for three.

FIG. 7 is one example of syntax in coded data of a unit. As shown in the syntax of FIG. 7, at the head of the coded data, codec_mode is encoded. For example, codec_mode can be represented by one bit flag.

If the coding mode information represents coding by the first coding section 103, i.e., if codec_mode is MODE_1, delta_qp which is a difference between a quantization parameter of a previous unit and a quantization parameter of a target unit is encoded. Next, pred_mode representing a prediction direction of spatial prediction is encoded. As to delta_qp and pred_mode, value range thereof is previously known. Accordingly, for example, they may be encoded at fixed-length. By the fixed-length coding, decode processing of the bit stream is easier. Furthermore, if value of the syntax is not biased, in comparison with variable-length coding, the coding efficiency is improved. Last, coeff which is quantized transform coefficient is encoded at variable-length. Here, NUM_COEFF represents the number of transform coefficients.

On the other hand, the coding mode information represents coding by the second coding section 104, i.e., codec_mode is MODE_2, in the same way as the first coding section 103, pred_mode is encoded. However, quantized transform coefficients are not encoded. Accordingly, delta_qp representing the quantization parameter need not be encoded.

In the coded data composing syntax, image quality is fallen due to coding by the second coding section 104. However, in comparison with the first coding section 103, the second coding section 104 can encode so as to generate a smaller amount of coded data sufficiently. Here, above-mentioned syntax is one example. In the same way as a general codec, new syntax may be added, or a part of the syntax may be deleted. Furthermore, the syntax may be changed due to component in the image.

Next, operation of the coding mode decision section 106 will be explained in detail. The coding mode decision section 106 receives the amount of coded data from the entropy coding section 105, and accumulatively stores the amount of generated coded data in the segment. From the accumulated amount of coded data stored, if a subsequent unit is encoded by the first coding mode, the coding mode decision section 106 decides whether the accumulated amount of coded data (including the generated amount of coded data of the subsequent unit) may be over the target amount of coded data to be guaranteed at the segment. If the accumulated amount of coded data may be over the target amount of coded data, the second coding mode is selected. If the accumulated amount of coded data may not be over the target amount of coded data, the first coding mode is selected. In this way, the coding mode is switched.

Figure 8:
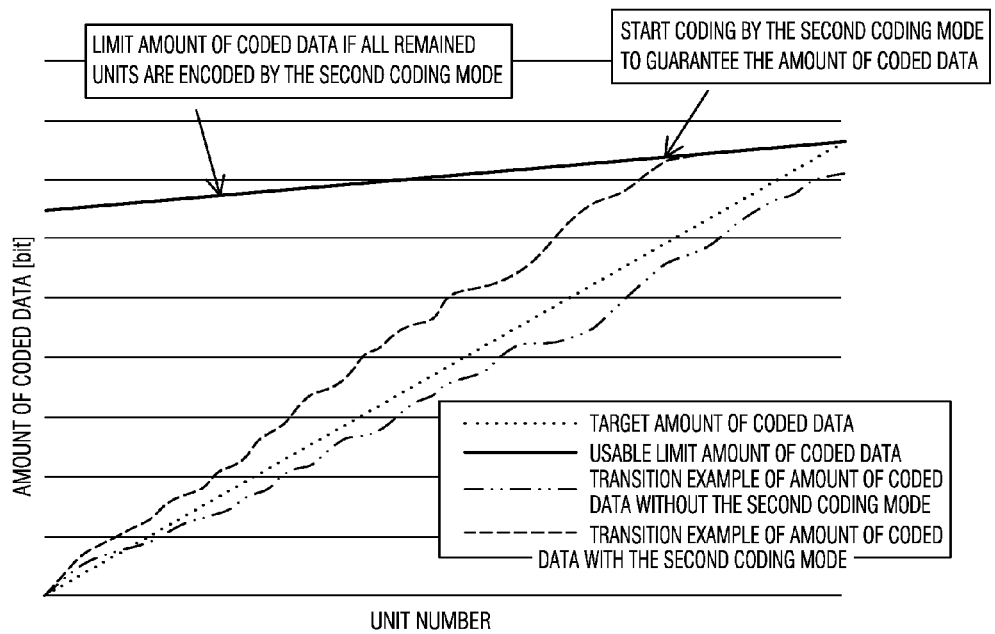
FIG. 8 is one example of transition of the accumulated amount of coded data and decision of the coding mode.

FIG. 8 shows relationship between transition of the amount of coded data and decision of the coding amount. By referring to FIG. 8, concrete example of operation of the coding mode decision section 106 will be explained. In FIG. 8, the horizontal axis represents unit number in the segment, and the vertical axis represents the accumulated amount of coded data. The solid line represents, if all remained units in the segment are encoded by the second coding mode, an upper limit of the accumulated amount of coded data within which a stream buffer is not failed. The thin broken line represents the target amount of coded data. In general, if the segment is encoded at CBR (Constant Bit Rate), for the purpose that the amount of coded data is equally generated from all units, by controlling the quantization parameter, coding by the target amount of coded data is planned. Here, at one-pass coding, the target amount of coded data cannot be always accomplished.

Accordingly, as shown in the thick broken line and two-dotted chain line, the amount of coded data generated from each unit is dispersed. The two-dotted chain line represents, if all remained units in the segment are encoded by the first coding mode, one example of the accumulated amount of coded data. When the accumulated amount of coded data actually generated is lower than the solid line, the amount of coded data can be guaranteed. The thick broken line represents, if the second coding mode is necessary, one example of the accumulated amount of coded data. When the accumulated amount of coded data actually generated is higher than the solid line, even if the second coding mode is selected, the amount of coded data cannot be guaranteed. In the example shown as the thick broken line, the amount of coded data generated by the first coding mode is largely over the target amount of coded data (represented by the thin broken line). The amount of coded data generated from remained units will be equal or over an upper limit of usable amount of coded data. Accordingly, by encoding all remained units at the second coding mode, the upper limit of the amount of coded data is guaranteed.

In order to perform above-mentioned operation, the coding mode decision section 106 decides the coding mode by equations (1) and (2).

$$B_{available} = B_{target} - (B_{total} + B_{max}(U_{delay} + 1)) \quad (1)$$

$$\begin{cases} \text{codec\_type} = \text{MODE\_1} & \text{if } (B_{available} >= B_{min}U_{left}) \\ \text{codec\_type} = \text{MPDE\_2} & \text{else} \end{cases} \quad (2)$$

First, the equation (1) will be explained. $B_{target}$ is the target amount of coded data in the segment. $B_{available}$ is the usable amount of coded data of remained units by excluding a unit (Hereinafter, denoted as "target unit") of which coding mode is decided from units to be encoded hereafter in the segment. $B_{total}$ is the accumulated amount of coded data feedbacked to decide the coding mode of the target unit. By subtracting $B_{total}$ from $B_{target}$, $B_{available}$ is calculated.

As shown in FIG. 5, as to the coding apparatus 100 of the first embodiment, pipeline processing is executed, and delay occurs in feedback of the amount of coded data. Namely, in example of FIG. 5, at timing when the coding mode of Unit#3 is decided, the amount of coded data of Unit#0 is only feedbacked, and the amount of coded data generated from Unit#1 and Unit#2 is unknown. Accordingly, in the equation (1), the maximum number of bits theoretically generated by the first coding mode is defined as $B_{max}$. Furthermore, on the assumption that the maximum number of bits is generated from units (including the target unit) of which the generated amount of coded data is unknown, the usable amount of coded data of remained units is calculated. In example of FIG. 5, the number of delayed units ($U_{delay}$) to feedback the amount of coded data is two. The number of delayed units is suitably changed based on pipeline component or processing content.

Next, the equation (2) will be explained. $B_{min}$ is the amount of coded data generated by the second coding mode. $U_{left}$ is the number of remained units calculated by excluding the target unit and delayed units from all units in the segment. Namely, even if the maximum amount of coded data is generated from the target unit and delayed units in feedback of the amount of coded data, if the accumulated amount of coded data is lower than the upper limit of the usable amount of coded data, the target unit is encoded by the first coding mode. If not so, the target unit and the remained units are encoded by the second coding mode. The above explanation is processing of the image coding apparatus 100.

As to the first embodiment, in addition to the first coding mode to regularly perform transform/quantization, the second coding mode is prepared. In the second coding mode, the amount of coded data of each unit is uniquely determined, and each unit is encoded so as to generate a smaller amount coded data in comparison with the first coding mode. By switching these two coding modes, it is guaranteed that the generated amount of coded data is not over the target amount of coded data. For example, each unit (unit to be encoded) is regularly encoded by the first coding mode. In a segment (unit to guarantee the amount of coded data), at timing when it is first decided that the amount of coded data is not guaranteed if all remained units are not encoded by the second coding mode, the first coding mode is switched to the second coding mode. As a result, the amount of coded data can be certainly guaranteed. Furthermore, by deciding the coding mode as mentioned-above, regular coding by the first coding mode is executed as much as possible, and, only if the amount of coded data to be assigned to remained units is not sufficient, coding by the second coding mode is executed. As a result, while image quality by regular coding is maintained just before the amount of coded data is not sufficient, the upper limit of the accumulated amount of coded data can be guaranteed.

The Second Embodiment

In the image processing apparatus 100 of the first embodiment, delay occurs in feedback of the amount of coded data. As shown in the equation (1), the maximum amount of coded data generated by the first coding mode need to be added as a plurality of units. This is equivalent to control with a margin. However, the margin becomes a large overhead due to a compression ratio or a size of the segment. As a result, the accumulated amount of coded data is greatly lower than the target amount of coded data, and sufficient image quality cannot be acquired. Accordingly, in the second embodiment, coding process so as not to generate delay in feedback of the amount of coded data is executed. This feature is different from the first embodiment.

Figure 9:
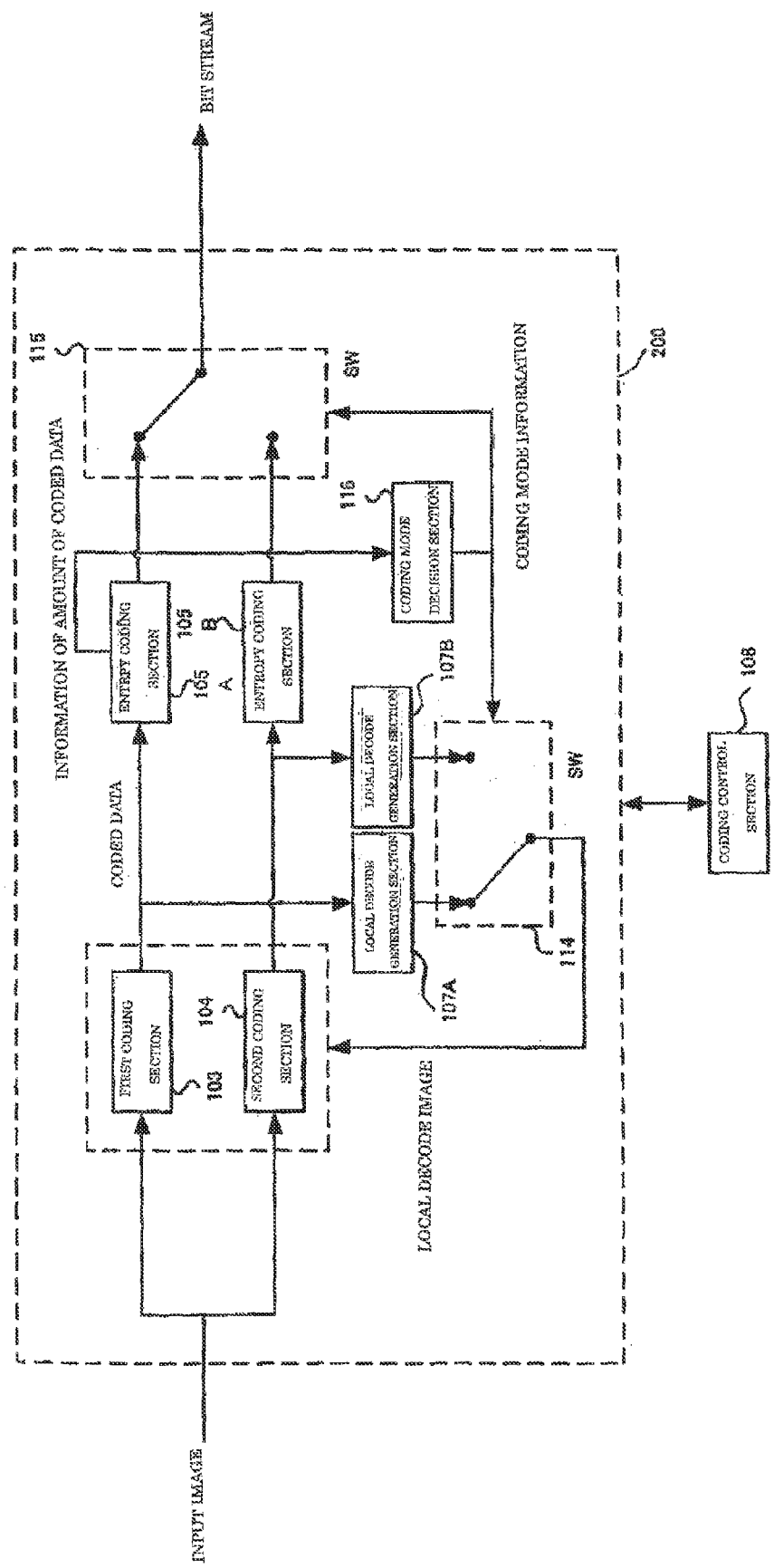
FIG. 9 is a block diagram of an image coding apparatus 200 according to the second embodiment.

FIG. 9 is a block diagram of an image coding apparatus 200 of the second embodiment. The image coding apparatus 200 includes a first coding section 103, a second coding section 104, an entropy coding section 105A, an entropy coding section 105B, a local decode generation section 107A, a local decode generation section 107B, a coding control section 108, a switch 114, a switch 115, and a coding mode decision section 116.

The first coding section 103, the second coding section 104 and the coding control section 108 operate similar to the respective section in the image coding apparatus 100. Accordingly, explanations thereof are omitted. Furthermore, the entropy coding section 105A and the entropy coding section 105B respectively operate similar to the entropy coding section 105, and the local decode generation section 107A and the local decode generation section 107B respectively operate similar to the local decode generation section 107. Accordingly, explanations thereof are also omitted.

The switch 114 receives respective local decode images of the first coding mode and the second coding mode from the local decode generation section 107A and the local decode generation section 107B. Furthermore, the switch 114 selects any of the local decode images according to the coding mode determined by the coding mode decision section 116, and sends the selected local decode image to the first coding section 103 and the second coding section 104. The selected local decode image is used for prediction as a reference image when a subsequent unit is encoded.

The switch 115 receives the coding mode information from the coding mode decision section 116. If the coding mode information is the first coding mode, the switch 115 receives a bit stream of the first coding mode from the entropy coding section 105A. If the coding mode information is the second coding mode, the switch 115 receives a bit stream of the second coding mode from the entropy coding section 105B. After that, the received bit stream is outputted.

The coding mode decision section 116 receives the amount of coded data (generated by encoding at the first coding mode) from the entropy coding section 105A, and outputs the coding mode information (set to the target unit) to the switches 114 and 115. The coding mode decision section 116 sets the coding mode to not a subsequent unit but the present target unit. This feature is different from the coding mode decision section 106.

Figure 10:
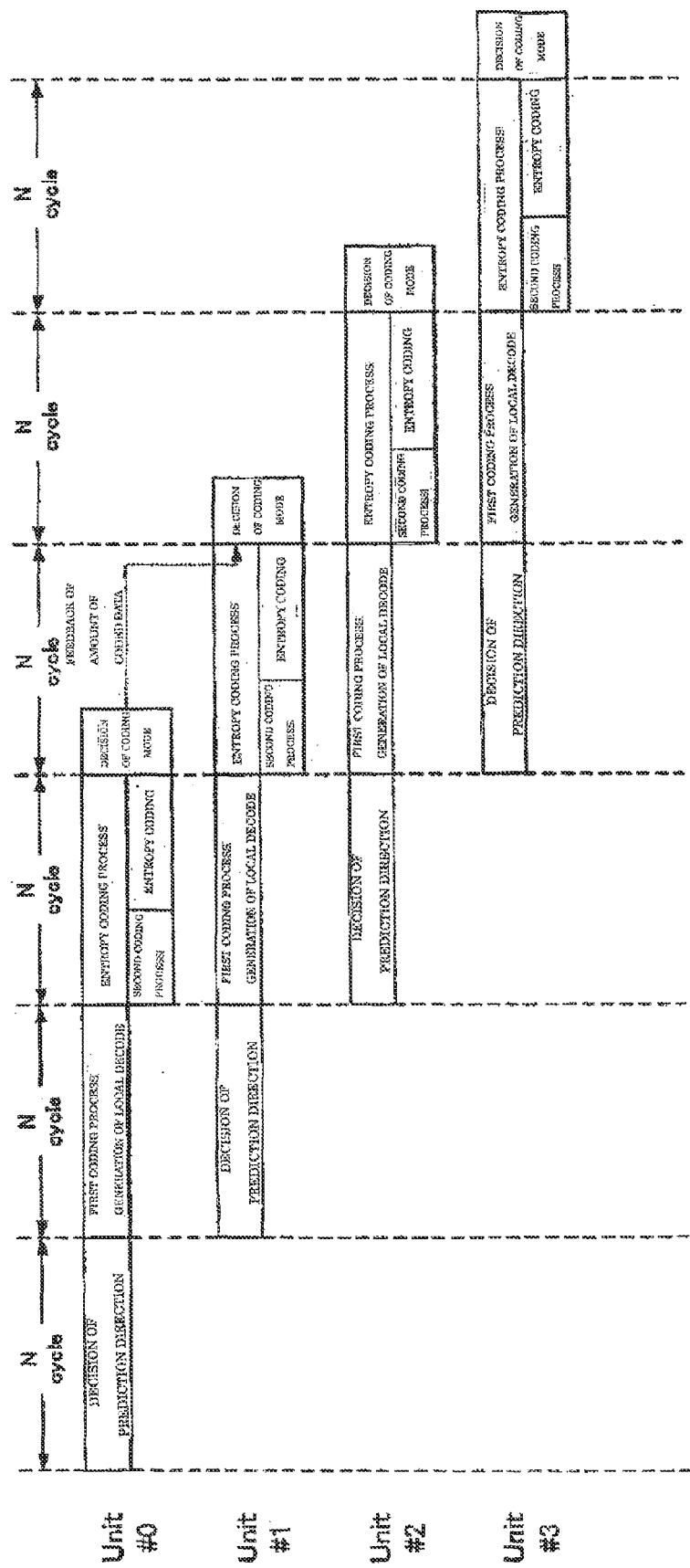
FIG. 10 is a timing chart of operation example of the image coding apparatus 200.

Next, coding process of the image coding apparatus 200 of the second embodiment will be explained in detail by referring to FIGS. 9, 10 and 11. FIG. 10 is an operation timing chart of the image coding apparatus 200. The image coding apparatus 200 receives the input image, and encodes each unit thereof in pipeline. This coding process is in accordance with the timing chart of FIG. 10. However, different from the image coding apparatus 100 of the first embodiment, bit streams are generated by executing both the coding process by the first coding mode and the coding process by the second coding mode. Last, the coding mode of the target unit is decided.

Figure 11:
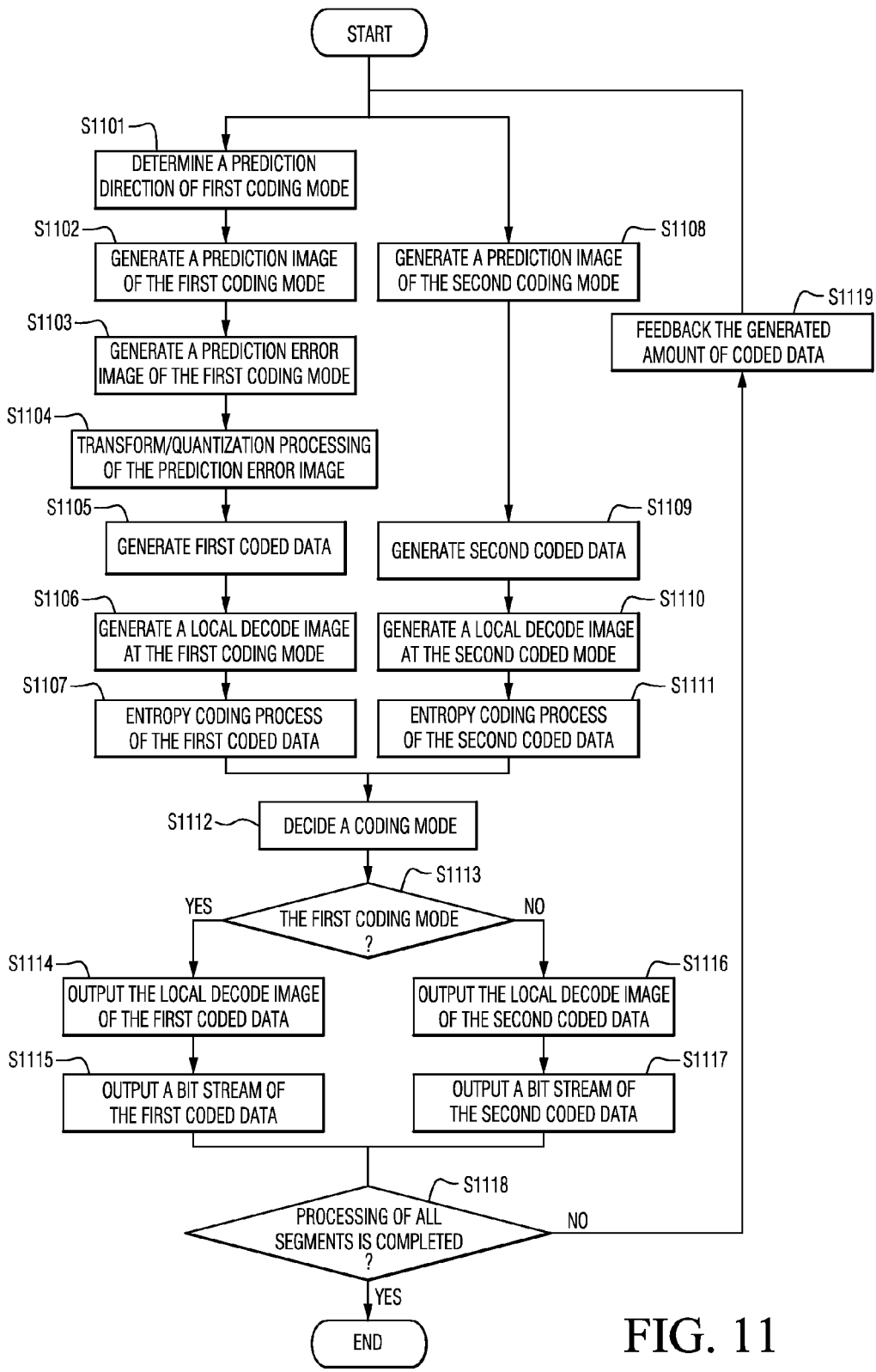
FIG. 11 is a flow chart of processing of the image coding apparatus 200.

FIG. 11 is a flow chart of processing of the image coding apparatus 200. When the image coding apparatus 200 receives pixels of a target unit in the input image, the coding control section 108 determines a prediction direction of the first coding mode (S1101). According to the prediction direction (determined at S1101), the prediction image generation section 109 (in the first coding section 103) generates a prediction image from pixel values of the adjacent units included in the local decode image. The subtractor 110 generates a prediction error image by subtracting the prediction image from the input image (S1103).

The transform/quantization section 111 generates quantized transform coefficients by executing transform/quantization process to the prediction error image (S1104). The transform/quantization section 111 generates the first coded data (S1105). The first coded data includes the quantized transformed coefficients, the coding mode information representing the coding by the first coding mode, the prediction direction, and the quantization parameter.

The local decode generation section 107A generates a local decode image by executing decoding process corresponding to the encoding process to the first coded data (S1106). The local decode image is sent to the switch 114. The entropy coding section 105A generates a bit stream by executing the entropy coding to the first coded data (S1107).

At S1101~S1107, the coding process by the first coding mode is executed. Here, the input image is also inputted to the second coding section 104, and the coding process by the second coding mode is also executed. In FIG. 11, in the same way as the first embodiment, an example that the second coding section 104 does not perform transform/quantization will be explained. However, the coding method of the second coding section 104 is not limited to this example.

The second coding section 104 generates a prediction image, and generates the second coded data (S1108). The second coded data is sent to the local decode generation section 107B. The local decode generation section 107B generates a local decode image by executing decoding process corresponding to the encoding process to the second coded data (S1110). In this example, the prediction image is the local decode image as it is. Accordingly, after receiving the prediction image from the second coding section 104, the local decode generation section 107B may set the prediction image to the local decode image. Alternatively, the local decode generation section 107B performs the same prediction processing as the second coding section 104. The local decode image is sent to the switch 114.

Furthermore, the second coded data is sent to the entropy coding section 105B. The entropy coding section 105B generates a bit stream by executing the entropy coding to the second coded data (S1111).

The coding mode decision section 116 receives the generated amount of coded data from the entropy coding section 105A, and decides the coding mode of the target unit (S1112). The coding mode information is sent to the switches 114 and 115. Detail processing of the coding mode decision section 116 will be explained afterwards.

If the coding mode information is the first coding mode (Yes at S1113), the switch 114 sends the local decode image received from the local decode generation section 107A to the first coding section 103 and the second coding section 104 (S1114). The switch 115 outputs the bit stream of the first coding mode received from the entropy coding section 105A (S1115).

If the coding mode information is the second coding mode (Yes at S1113), the switch 114 sends the local decode image (received from the local decode generation section 107B) to the first coding section 103 and the second coding section 104 (S1116). The switch 115 outputs the bit stream of the second coding mode received from the entropy coding section 105B (S1117).

If the coding process of all units included in the target segment is not completed (No at S1118), the entropy coding section 105A and the entropy coding section 105b send the generated amount of coded data to the coding mode decision section 116 respectively (S1119). Here, at the second coding mode, the coding process by the fixed amount of coded data is performed. Accordingly, the entropy coding section 105B need not always send the generated amount of coded data. If the coding process of all units included in the target segment is completed (Yes at S1118), the coding process of the segment is completed.

Next, operation of the coding mode decision section 116 will be explained in detail. The coding mode decision section 116 receives the amount of coded data generated by the first coding mode from the entropy coding section 105A, and decides the coding mode of the target unit. As shown in FIG. 10, the image coding apparatus 200 decides the coding mode of each unit after encoding process of the target unit is completed. This feature is different from the image coding apparatus 100 of the first embodiment. As a result, even if pipeline processing is executed, delay in feedback of the amount of coded data can be removed.

By an equation (3), the coding mode decision section 116 calculates $B_{available}$. Here, $B_{available}$ is the usable amount of coded data of remained units in the segment.

$$B_{available} = B_{target} - (B_{total} + B_{current}) \quad (3)$$

In the equation (3), $B_{current}$ is the amount of coded data generated by encoding the target unit by the first coding mode. The coding mode decision section 116 receives $B_{current}$ from the entropy coding section 105A. In the same way as the equation (1), $B_{total}$ is the accumulated amount of coded data feedbacked when the target unit is encoded. As shown in FIG. 10, the amount of coded data generated from a previous unit is immediately feedbacked. This feature is different from the image coding apparatus 100 of the first embodiment.

By using $B_{available}$ calculated from the equation (3), the coding mode is decided by the equation (2). In the second embodiment, by deciding the coding mode as mentioned-above, the coding mode can be decided without a margin equivalent to the maximum amount of coded data of several units. As a result, the coding can be realized with fewer degradation of the image quality.

Operation of the second coding section 104 will be explained in detail. In the same way as the image coding apparatus 100, in the second embodiment, the second coding section 104 encodes so as to generate the amount of coded data smaller than (or equal to) the predetermined amount of coded data. This coding method may be arbitrary. However, in comparison with the image coding apparatus 100, the image coding apparatus 200 has a constraint related to generation of the local decode image. By executing processing at the respective timing shown in FIG. 10, the coding process of the first coding mode and the coding process of the second coding mode are simultaneously executed. This simultaneous execution is pipeline processing. Accordingly, at the second processing stage of each unit, a part of the local decode image must be determined. For example, when Unit#0 executes the third processing stage, Unit#1 executes the coding by the first coding mode at the second processing stage. Accordingly, the local decode image used for prediction of Unit#1 needs to be determined. Pixels at the right edge of each unit are used for prediction. So, these pixels of the local decode image generated by the second coding process must be same as the pixels of the local decode image generated by the first coding process.

FIG. 12 is one example of syntax of coded data of the unit according to the second embodiment. By using the syntax shown in FIG. 12, above-mentioned problem can be solved. In FIG. 12, if codec_mode is MODE__1, the syntax at the first coding mode is same as FIG. 7. On the other hand, if codec_mode is MODE__2, the syntax at the second coding mode is different from FIG. 7. In the syntax of FIG. 7, information related to the prediction direction is only encoded, and the local decode image is same as the prediction image. Accordingly, this local decode image is often different from the local decode image generated at the first coding mode of the second embodiment.

Accordingly, pixel values of the pixels used for prediction of a next unit (adjacent to the target unit) is set to be same as the pixel values of the local decode image generated by the first coding mode and encoded by PCM (Pulse Code Modulation). In FIG. 12, the pixel value represents a pixel value to be encoded by PCM. Here, PCM represents processing to output the pixel value as it is. NUM_PCM_PIXEL represents the number of pixels encoded by pixel_value. In this case, in comparison with FIG. 7, the amount of coded data encoded by the second coding mode becomes larger. However, the problem related to the prediction of the subsequent unit can be solved.

FIG. 13 is another example of syntax of coded data of a unit according to the second embodiment. In FIG. 13, if the second coding mode is selected, additional information is not encoded, and a constraint is set to the prediction direction. From the equations (3) and (2), if the second coding mode is selected once, the first coding mode is not selected in the same segment. Accordingly, for example, by prohibiting the prediction from the left unit (adjacent to the target unit), the problem related to the prediction of the subsequent unit can be solved. In the second embodiment, at the second coding mode, an example that the prediction from the upper direction (upper unit adjacent to the target unit in the segment) is always performed is explained. Here, the prediction from the upper direction is one example. If the prediction of the subsequent unit is not influenced, any direction may be used.

As to the coding by the second coding mode, the image quality is largely degraded. In the second embodiment, by performing above-mentioned decision of the coding mode, in comparison with the image coding apparatus 100, the second coding mode is controlled so as to be not selected. Furthermore, the upper limit of the accumulated amount of coded data for the segment can be guaranteed.

The Third Embodiment

In the image coding apparatus 200, in order to guarantee the amount of coded data of each segment, the first coding section 103 and the second coding section 104 are adaptively switched. Here, the amount of coded data of each segment is guaranteed. However, the amount of coded data of each unit cannot be always guaranteed. For example, when the first coding section 103 encodes, the amount of coded data larger than the amount of data of the input image can be generated due to the coding parameter. Accordingly, an image coding apparatus 300 of the third embodiment equips a third coding section 117 to encode using a method different from the first coding section 103 and the second coding section 104.

Figure 14:
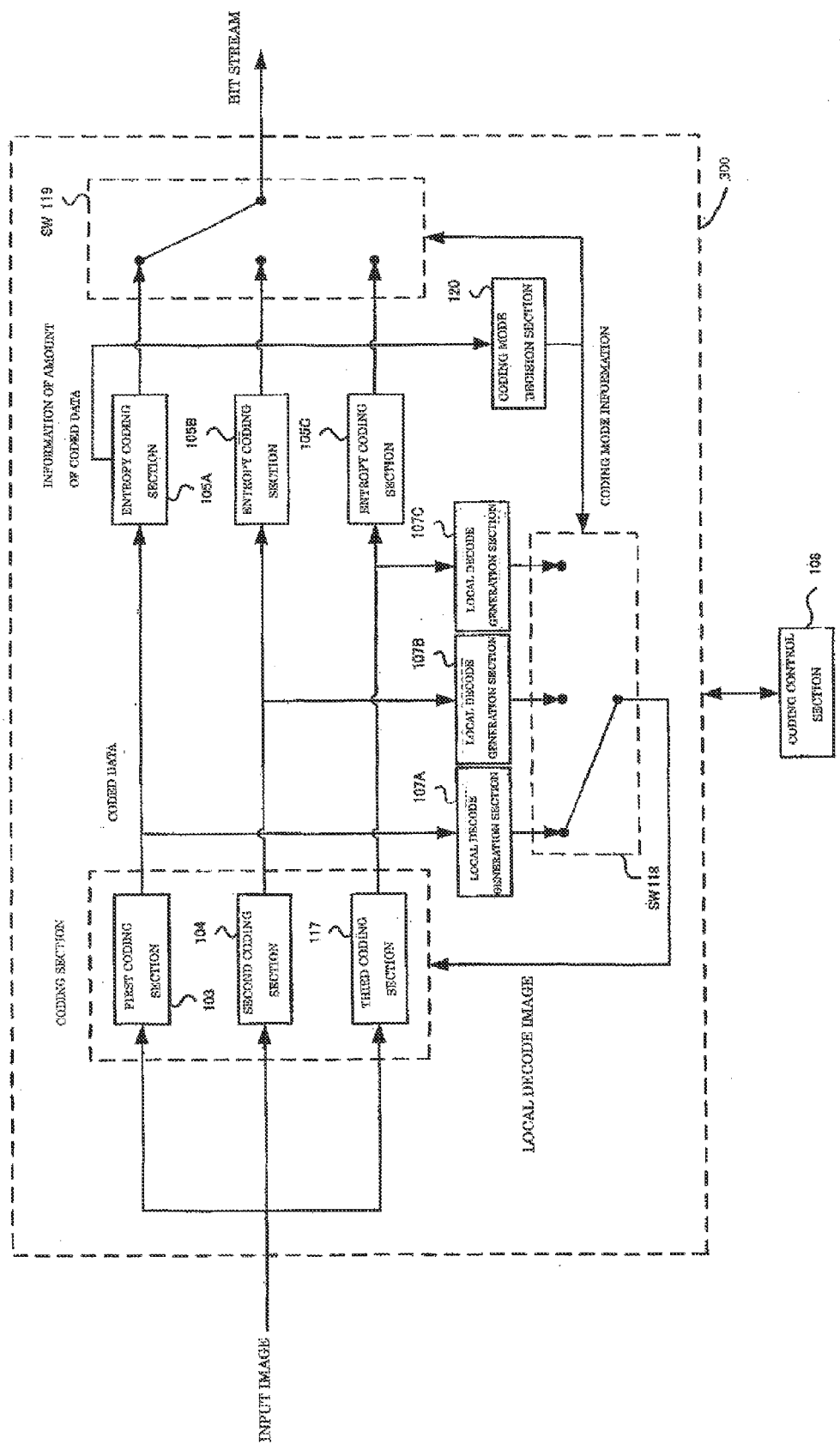
FIG. 14 is a block diagram of an image coding apparatus 300 according to the third embodiment.

FIG. 14 is a block diagram of the image coding apparatus 300. The image coding apparatus 300 includes a first coding section 103, a second coding section 104, the third coding section 117, entropy coding sections 105A~C, a mode decision section 120, switches 118 and 119, local decode generation sections 107A~C, and a coding control section 108. As to the section executing the same operation as the image coding apparatuses 100 and 200, explanations thereof is omitted.

The third coding section 117 receives pixels of a target unit of the input image, encodes the pixels so as to generate the predetermined amount of coded data, and generates the third coded data. The switch 118 receives respective local decode images of the first coding mode, the second coding mode and the third coding mode from the local decode generation section 107A, the local decode generation section 107B and the local decode generation section 107C. According to the coding mode determined by the coding mode decision section 120, the switch 118 sends any of the local decode images to the first coding section 103, the second coding section 104 and the third coding section 117. The local decode image is used for prediction as a reference image when a subsequent unit is encoded.

The switch 119 receives respective bit streams of the first coding mode, the second coding mode and the third coding mode from the entropy coding section 105A, the entropy coding section 105B and the entropy coding section 105C. According to the coding mode determined by the coding mode decision section 120, the switch 119 outputs any of the bit streams. The coding mode decision section 120 receives the amount of coded data generated by the first coding mode from the entropy coding section 105A. Furthermore, the coding mode decision section 120 sets the coding mode of the target unit, and outputs the coding mode information to the switches 118 and 119.

As to entire processing flow of the image coding apparatus 300, explanation with reference to Figure is omitted. For example, at the same time as S1101~S1107 and S1108~S1111 in FIG. 11, the third coding section encodes, and any of the bit streams is outputted according to the coding mode selected. In following explanation, an operation of the image coding apparatus 300 that executes pipeline processing according to the timing chart of FIG. 10 will be explained as an example. Moreover, as another modification example, as shown in the first embodiment, if the decided coding mode is the third coding mode, the third coding section 117 may generate the third coded data and the local decode image.

Operation of the third coding section 117 will be explained in detail. As mentioned-above, as to the coding by the first coding section 103, the amount of coded data of each unit cannot be always guaranteed. On the other hand, the second coding section 104 encodes so as to generate the predetermined amount of coded data. Accordingly, the amount of coded data of each unit can be guaranteed. However, as to the coding by the second coding section 104, the case that the generated amount of coded data of each segment is over the target amount of coded data thereof without using second coding mode is supposed. As a result, the image quality is greatly degraded.

The third coding section 117 encodes so as to generate the amount of coded data smaller than (or equal to) the predetermined amount of coded data. The amount of coded data generated by the third coding section 117 is sufficiently larger than the amount of coded data generated by the second coding section 104. When the amount of coded data generated by the first coding section 103 is larger than the amount of coded data generated by the third coding section 117, the coding by the first coding section 103 is switched to the coding by the third coding section 117. As a result, the maximum amount of coded data of each unit can be guaranteed.

As the coding method of the third coding section 117, arbitrary method can be used. Here, as mentioned-above, the coding process to generate the amount of coded data smaller than (or equal to) the predetermined amount of coded data is desired. For example, pixels of the input image may be outputted as it is by PCM mode. As mentioned-above, in the coding process by the first coding section 103, the amount of coded data larger than the amount of the input image may be often generated. Accordingly, by setting the third coding mode to PCM, when the amount of coded data generated by the first coding section 103 is larger than the amount of the input image, the coding process by PCM mode can be selected. An example of syntax of this case is shown in FIG. 15. As to the case that codec_mode is MODE_1 or MODE_2, the syntax is same as FIG. 13. If codec_mode is MODE_3 (the third coding mode), pixel values of pixels of which the number is NUM_PIXEL_UNIT in the target unit are encoded as input_pixel_value.

In above-mentioned example, the case of PCM is explained. However, by quantizing pixel values of the input image, the number of bits of each pixel may be deleted. Furthermore, by executing prediction/transform processing similar to the first coding section 103, or by executing general DPCM (differential pulse-code modulation) processing to PCM-encode a difference between adjacent pixels, the transform coefficient or the error image may be quantized by a predetermined parameter.

Furthermore, as to a part of or all pixels in the unit, if the local decode image needs to be same as the local decode image generated by another coding mode, differential data may be added. In the same way as the second coding mode, as to the third coding mode, a constraint for the generated local decode image exists. Namely, as to pixels located at the right edge in the unit, the pixels of the local decode image generated at the third coding mode needs to be same as the pixels of the local decode image generated at the first coding mode.

For example, if the input image is encoded by PCM, after pixel values of the input image is encoded by PCM, as to pixels at the right edge in the unit, a differential value between pixel values of the local decode image (generated by the first coding section 103) and pixel values of the input image is calculated, and the differential value is encoded. As a result, above-mentioned problem can be avoided.

The local decode generation section 107C can obtain pixels at the right edge in the unit by adding pixel values of the input image to the differential value decoded. Here, the pixel values of the input image are obtained by decoding the bit stream generated with PCM. Accordingly, the image coding apparatus 300 can execute prediction processing by using pixels of the local decode image generated by the first coding section 103 as reference pixels. In this case, the third coding section 117 may execute process by receiving pixel values of the local decode image generated by the first coding section 103. Alternatively, the third coding section 117 may generate the same local decode image.

FIG. 16 is another example of syntax. In the example of FIG. 16, a differential value between pixel values of the local decode image (generated by the first coding section 103) and pixel values of the input image is encoded as diff_pixel_value. This feature is different from the example of FIG. 15. Here, NUM_REF_PIXEL is the number of pixels used as the reference pixel. In the third embodiment, only pixels at the right edge in the unit are targeted. Accordingly, NUM_REF_PIXEL is equal to the number of pixels along the vertical direction in the unit. Moreover, in order to avoid complicated processing, pixels at the lower edge in the unit may be targeted. Above-mentioned process is one example. Only if the constraint related to pixels at the right edge in the unit is satisfied, arbitrary method may be used.

Next, operation of the coding mode decision section 120 will be explained in detail. The coding mode decision section 120 receives the amount of coded data (generated by the first coding mode) from the entropy coding section 105A, and decides the coding mode of the target unit. As shown in an equation (4), among the amount of coded data $B_{MODE\_1}$ of the first coding mode and the amount of coded data $B_{MODE\_3}$ of the third coding mode, the coding mode decision section 120 sets a value of the smaller one to $B_{current}$.

$$B_{current} = \min(B_{MODE\_1}, B_{MODE\_3}) \quad (4)$$

By using $B_{current}$ and the equation (3) the coding mode decision section 120 calculates $B_{available}$. Furthermore, the coding mode section 120 decides the coding mode by an equation (5).

$$\begin{cases} codec\_type = MODE\_1 & if \begin{pmatrix} B_{available} >= B_{min}U_{left} \,\&\& \\ B_{MODE\_1} < B_{MODE\_3} \end{pmatrix} \\ codec\_type = MODE\_3 & elseif(B_{available} >= B_{min}U_{left}) \\ codec\_type = MODE\_2 & else \end{cases} \quad (5)$$

Figure 17:
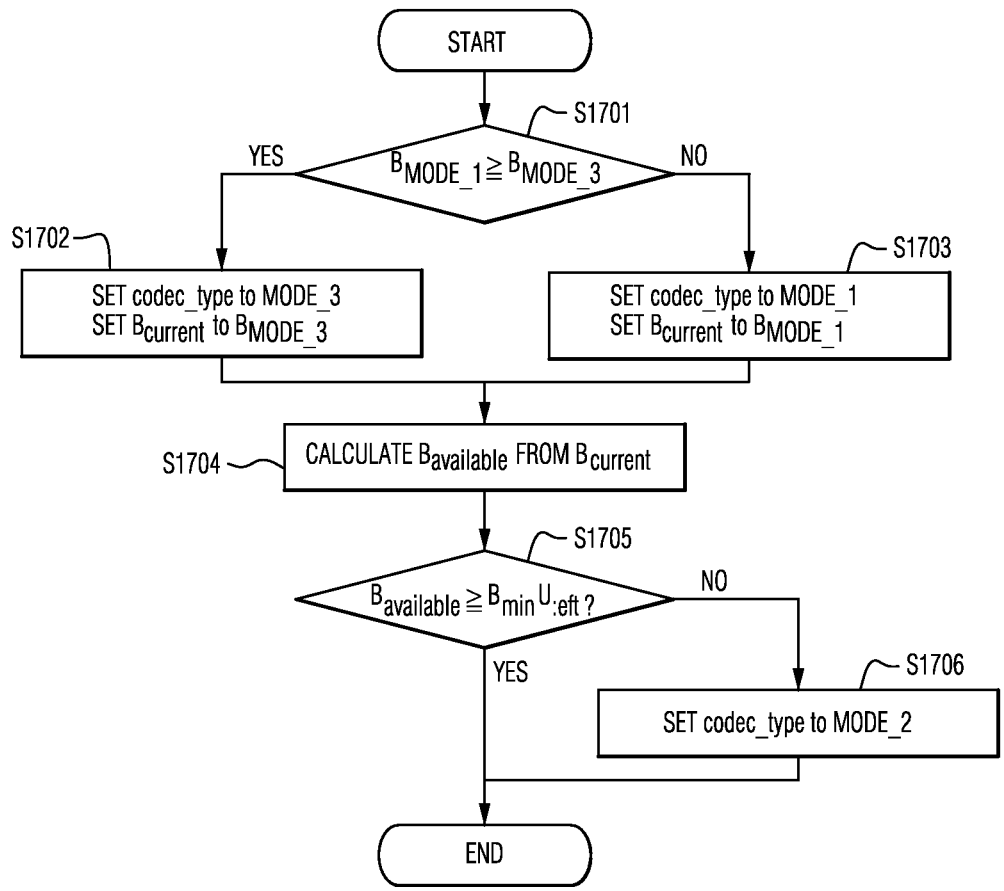
FIG. 17 is a flow chart of processing of the image coding apparatus 300.

FIG. 17 is a flow chart of operation of the coding decision section 120. First, if $B_{MODE\_1}$ is larger than (or equal to) $B_{MODE\_3}$ (Yes at S1701) codec_type is set to MODE_3, and $B_{current}$ is set to $B_{MODE\_3}$ (S1702). If not so (No at S1701), codec_type is set to MODE_1, and $B_{current}$ is set to $B_{MODE\_1}$ (S1702). According to the equation (3), $B_{available}$ is calculated (S1704). In the same way as the equation (2), it is decided whether the amount of coded data in the segment can be guaranteed even if the unit is encoded by the first coding mode or the third coding mode (already selected). In this case, if it is decided that the amount of coded data cannot be guaranteed (No at S1705), the second coding mode is selected (S1706). If not so (Yes at S1705), the coding mode selected at S1702 or S1703 is used. By above-mentioned processing, while the maximum amount of coded data of each unit is guaranteed by the third coding mode, the amount of coded data of each segment can be guaranteed by the second coding mode.

In above-mentioned example, for the purpose to guarantee the amount of coded data of each unit, the third coding mode is utilized. In comparison with the second coding mode, in the third coding mode, the sufficient larger amount of coded data is supposed. For example, when PCM is used for the third coding mode, in comparison with the first coding mode and the second coding mode, the coding can be performed with high image quality. Accordingly, for example, as shown in the equation (6), even if all remained units in the segment are encoded by the third coding mode, at timing when it is decided that the accumulated amount of coded data is not over the target amount of coded data, the coding by the third coding mode may be selected.

$$\begin{cases} codec\_type = MODE\_1 & if \begin{pmatrix} B_{available} >= B_{min}U_{left} \,\&\& \\ B_{MODE\_1} < B_{MODE\_3} \,\&\& \\ B_{available} < B_{MODE\_3}U_{left} \end{pmatrix} \\ codec\_type = MODE\_3 & elseif(B_{available} >= B_{min}U_{left}) \\ codec\_type = MODE\_2 & else \end{cases} \quad (6)$$

According to the image coding apparatus 300 of the third embodiment, the coding process to guarantee the amount of coded data of each unit can be performed.

The Fourth Embodiment

In general, by adaptively setting the quantization scale with the rate control, the accumulated amount of coded data can be converged to the target amount of coded data. Accordingly, an image coding apparatus 400 of the fourth embodiment performs the rate control.

Figure 18:
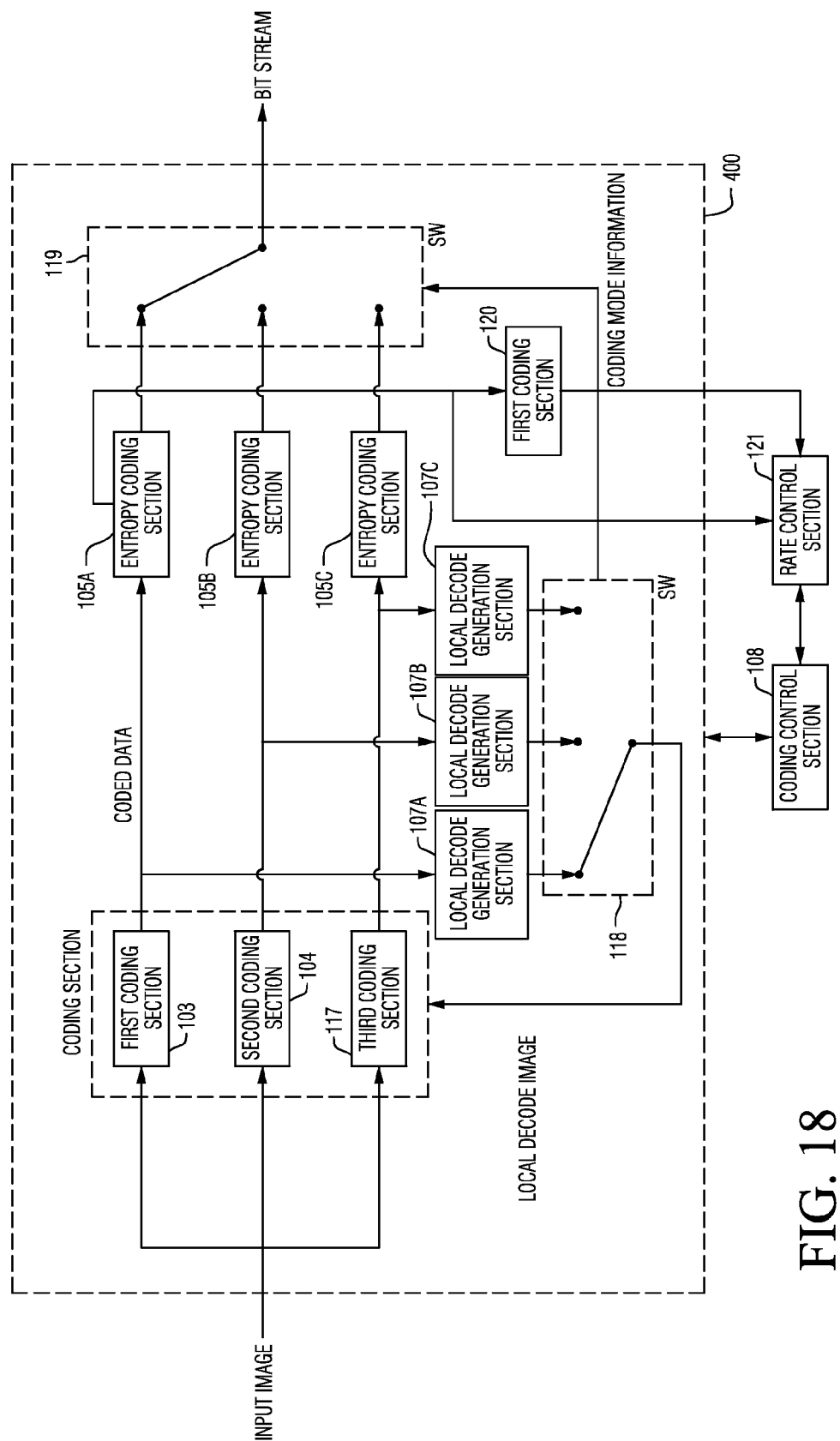
FIG. 18 is a block diagram of an image coding apparatus 400 according to the fourth embodiment.
Figure 19:
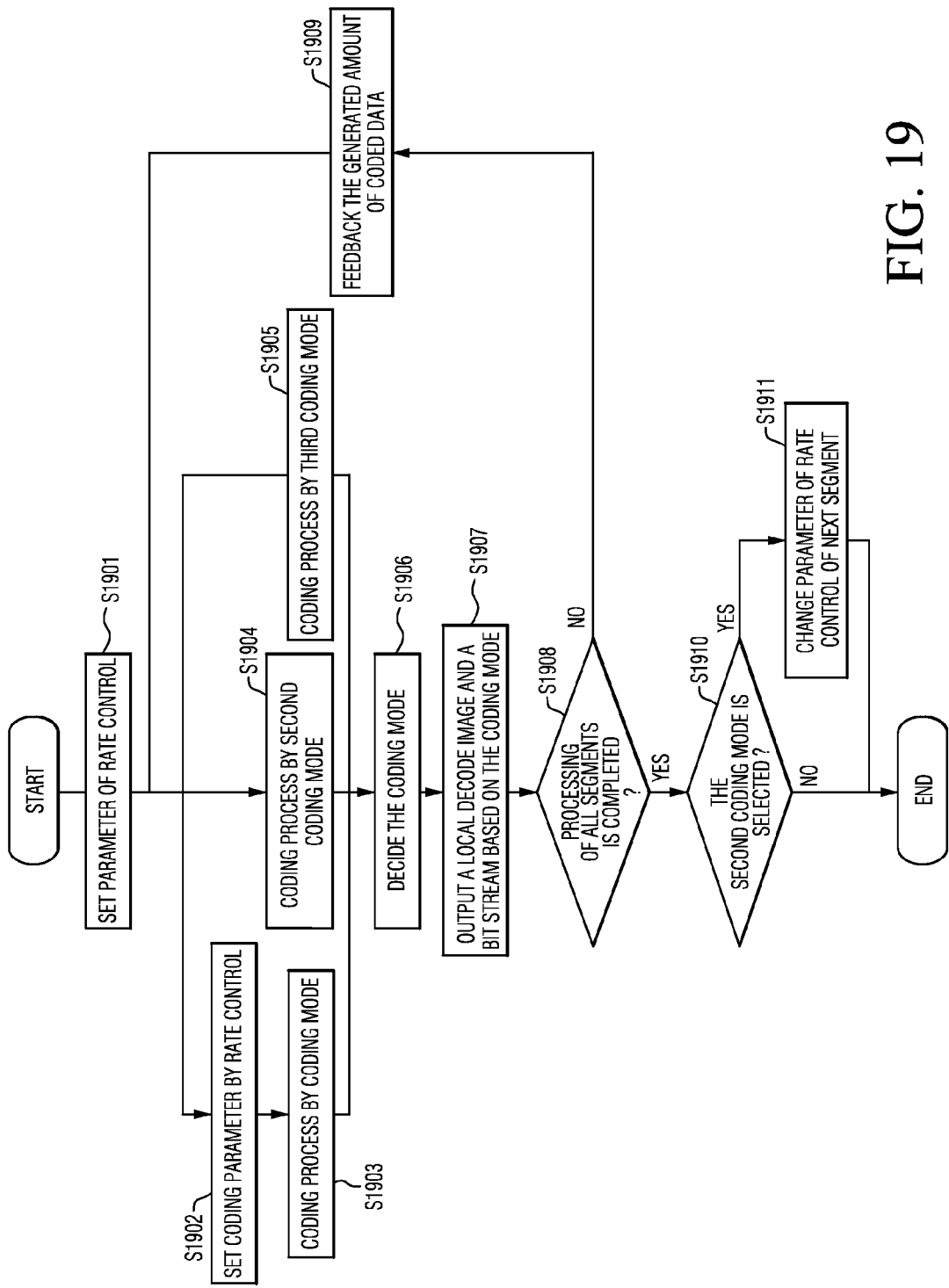
FIG. 19 is a flow chart of processing of the image coding apparatus 400.

FIG. 18 is a block diagram of the image coding apparatus 400. The image coding apparatus 400 further includes a rate control section 121. Other sections therein perform the same operation as those of the image coding apparatus 300. Accordingly, explanations thereof are omitted.

The rate control section 121 receives the amount of coded data of the first coding mode from the entropy coding section 105A, and receives the coding mode information from the coding mode decision section 120. The rate control section 121 controls the rate by adaptively setting the coding parameter of the first coding section 103 via the coding control section 108. As the rate control, a general method used for TM5 may be used.

Next, operation of the rate control section 121 will be explained. When an image to be encoded is inputted to the image coding apparatus 400, the rate control section 121 sets a parameter for the rate control (S1901). For example, if the rate control of TM5 is performed, the rate control section 121 sets an initial value of a rate buffer or feedback intensity for the generated amount of coded data. As a parameter of the rate control, a predetermined constant value may be used. Furthermore, the parameter may be set based on information such as a size or a format of the input image.

Based on the parameter set for the rate control, the rate control section 121 sets a coding parameter necessary for the first coding mode such as a quantization parameter (S1902). According to the coding parameter set at S1902, the first coding section 103 encodes a target unit of the input image by the first coding mode (S1903). The second coding section 104 and the third coding section 117 encode the target unit by the second coding mode and the third coding mode respectively (S1904, S1905). These coding processes are same as those of the image coding apparatus. Accordingly, explanations thereof are omitted.

Based on these encoded result, the coding mode decision section 120 selects the coding mode (S1906). The switch 118 sends a local decode image corresponding to the selected coding mode, and the switch 119 outputs a bit stream corresponding to the selected coding mode (S1907). If coding process of all units in the segment is not completed (No at S1908), the entropy coding section 105A sends the amount of coded data of the first coding mode to the coding mode decision section 120 and the rate control section 121, and the coding mode decision section 120 sends the coding mode information to the rate control section 121 (S1909). Here, at the second coding mode and the third coding mode, the coding process is executed so as to generate the predetermined amount of coded data. Accordingly, even if the generated amount of coded data is not sent, the amount of coded data can be decided by the coding mode information only.

If coding process of all units in the segment is completed (Yes at S1908) and if the second coding mode is selected (Yes at S1910), the rate control section 121 changes a parameter of a next segment (S1911). As a method for changing the parameter, for example, the feedback intensity of the amount of coded data is strengthened. The selection of the second coding mode means that, the accumulated amount of coded data cannot be converged because the amount of coded data is greatly generated by regular rate control. By adaptively changing the parameter of rate control, the rate can be stably controlled so as not to select the second coding mode at the next segment.

In the fourth embodiment, the rate control process in the case of selecting the second coding mode is already explained. On the other hand, if the third coding mode is selected because of the surplus of the amount of coded data, this case means that the amount of coded data is not sufficiently utilized. In this case, by setting the parameter such as weakening the feedback intensity, stable image quality can be acquired. Furthermore, in the fourth embodiment, the example that the parameter of rate control of each segment is already explained. However, the parameter of rate control of one group (a plurality of units) or each frame may be changed.

As mentioned-above, the rate control section 121 controls the rate by feedback of the generated amount of coded data of each unit. For example, when the amount of coded data larger than the target amount of coded data is generated, by making the quantization parameter be larger, the generated amount of coded data is suppressed to be smaller. On the other hand, when the amount of coded data smaller than the target amount of coded data is generated, by making the quantization parameter be smaller, the generated amount of coded data is mitigated to be larger. As a result, the generated amount of coded data can be converged to the target amount of coded data.

Moreover, in the fourth embodiment, in order to easily understand, the rate control section 121 is explicitly explained. However, this rate control processing may be executed by the coding control section 108.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for coding an image, comprising:
a first coding section configured to encode a target block by a first coding mode to generate first coded data, the target block being included in a segment into which an input image is divided;
a second coding section configured to encode the target block by a second coding mode to generate second coded data, an amount of the second coded data being predetermined;
a decision section configured to decide whether to encode by the first coding mode or the second coding mode; and
a selection section configured to select one of the first coded data and the second coded data, based on a decision result of the decision section;
wherein the decision section decides to encode by the second coding mode if a total amount of coded data of the segment in the input image is over a target amount of coded data, and
the total amount of coded data being a sum of an accumulated amount of coded data obtained by encoding blocks in the segment prior to the target block, an amount of the first coded data of the target block, and an amount of coded data to be obtained by encoding remained blocks in the segment by the second coding mode.

2. The apparatus according to claim 1, wherein
the second coding section does not encode the target block by predicting using pixel values of blocks encoded prior to the target block in the segment.

3. The apparatus according to claim 1, further comprising:
a third coding section configured to generate third coded data of which amount is larger than an amount of the second coded data from the target block by a third coding mode;
wherein the decision unit decides to encode by the third coding mode if the amount of the first coded data is over an amount of the third coded data.

4. The apparatus according to claim 1, further comprising:
a rate control section configured to adaptively set a quantization parameter based on the amount of coded data generated;
when the second coding mode is selected at the segment,
wherein the rate control section adaptively changes the parameter to use at a next segment.

5. The apparatus according to claim 3, wherein
the third coded data includes pixel values of the target block in the input image, and at least one of differential values between the pixel values in the input image and corresponding pixel values of the decoded block obtained by decoding the first coded data.

6. The apparatus according to claim 2, wherein
the second coding section encodes the target block by predicting using pixel values of an upper block in the segment, and does not encode transform/quantization coefficients of the target block.

7. The apparatus according to claim 1, wherein
the decision section decides to encode by the second coding mode if a total amount of coded data of the segment is over the target amount of coded data,
the total amount of coded data being a sum of the accumulated amount of coded data, a maximum amount of coded data to be generated from a next block in the segment by the first coding mode, and an amount of coded data to be generated from the remained blocks in the segment by the second coding mode.

8. A method for coding an image, comprising:
generating first coded data from a target block in an input image by a first coding mode;
generating second coded data of which amount is predetermined from the target block by a second coding mode;
deciding whether to encode by the first coding mode or the second coding mode; and
selecting one of the first coded data and the second coded data, based on a decision result of the deciding;
wherein the deciding includes
deciding to encode by the second coding mode if a total amount of coded data of a segment in the input image is over a target amount of coded data, the segment comprising a plurality of blocks including the target block, and the total amount of coded data being a sum of an accumulated amount of coded data generated from blocks prior to the target block in the segment, an amount of the first coded data, and an amount of coded data to be generated from remained blocks in the segment by the second coding mode.

* * * * *